Nov. 3, 1931. W. R. BECKLEY ET AL 1,830,082
ATTACHMENT FOR CINEMA PROJECTORS
Filed July 27, 1927 3 Sheets-Sheet 1
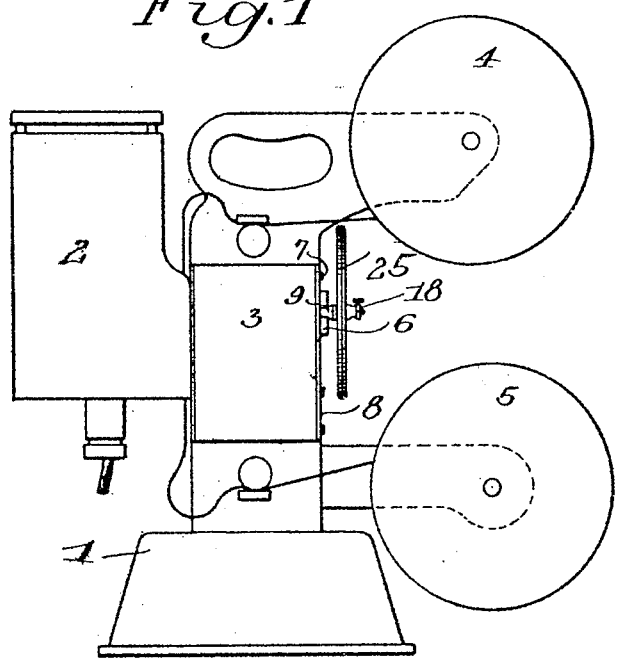
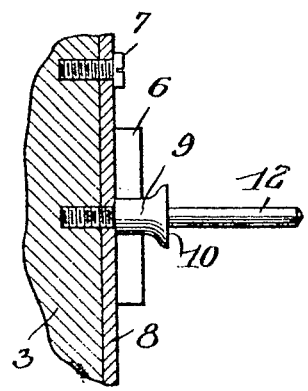
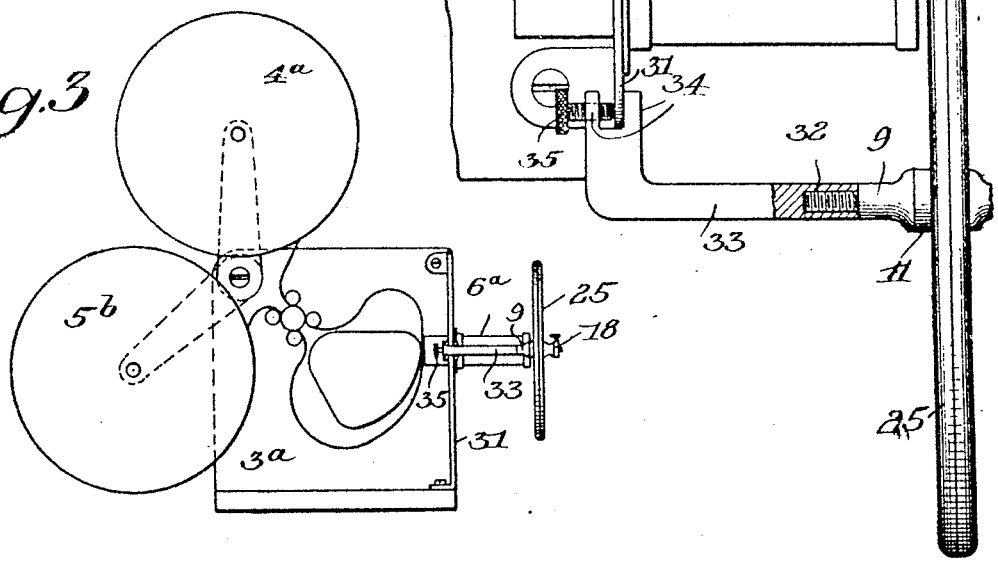
INVENTORS
Walter R. Beckley, Alfred E. Church and
BY Joseph F. Merkel
their ATTORNEYS

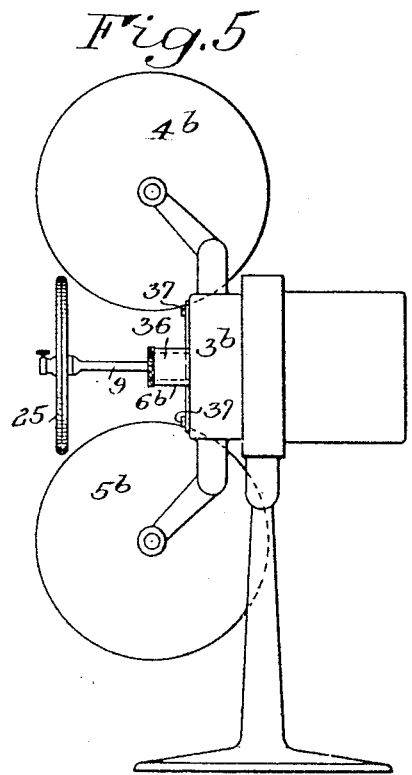
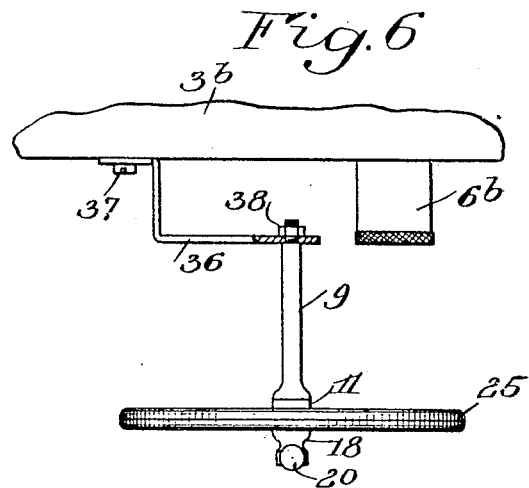
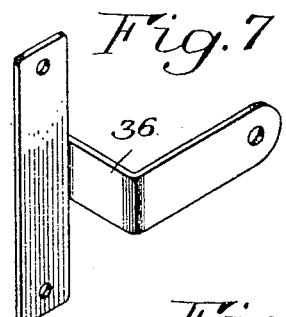
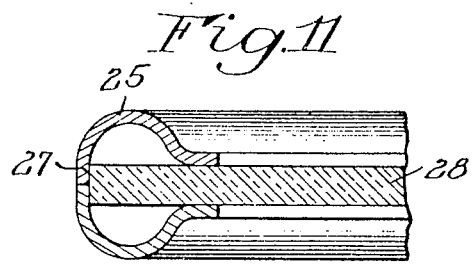
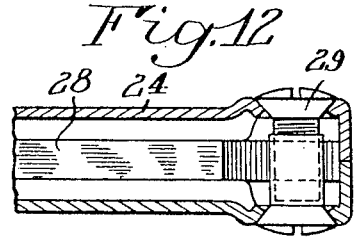
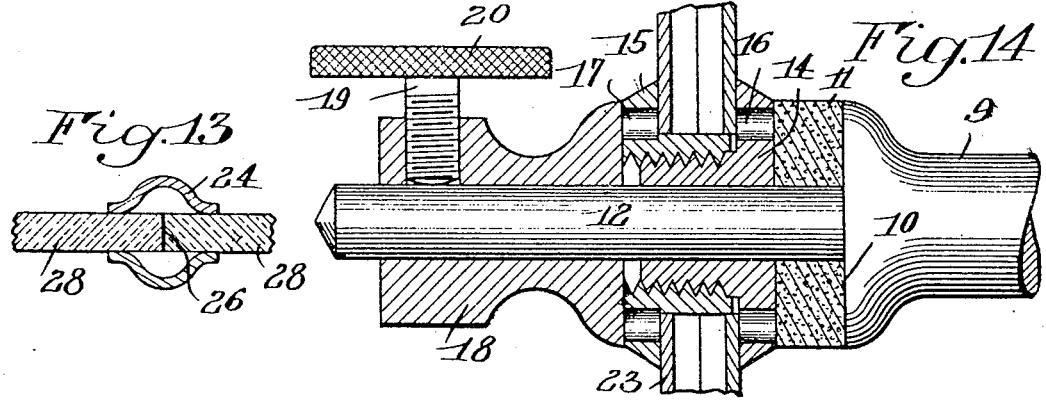

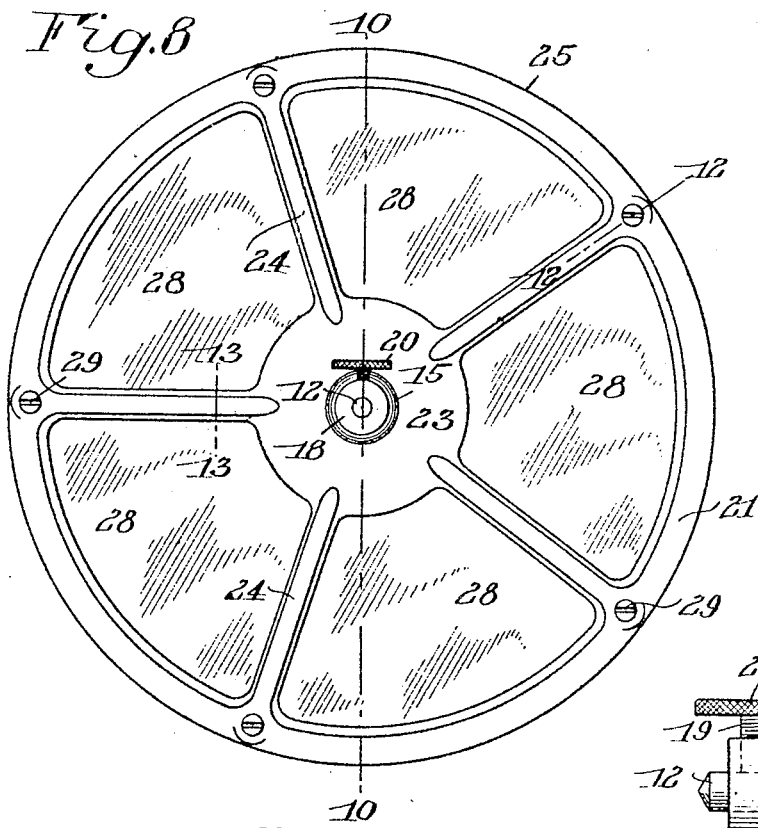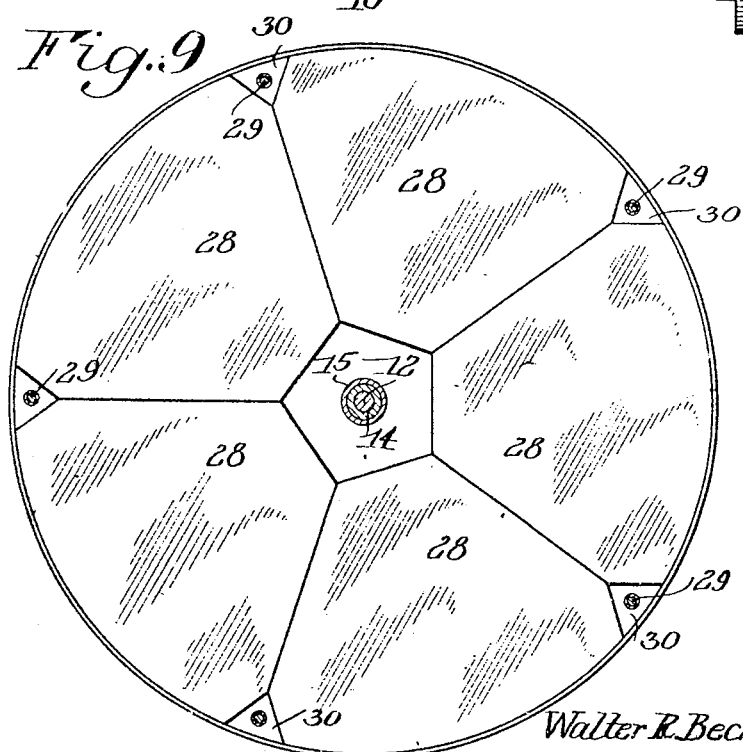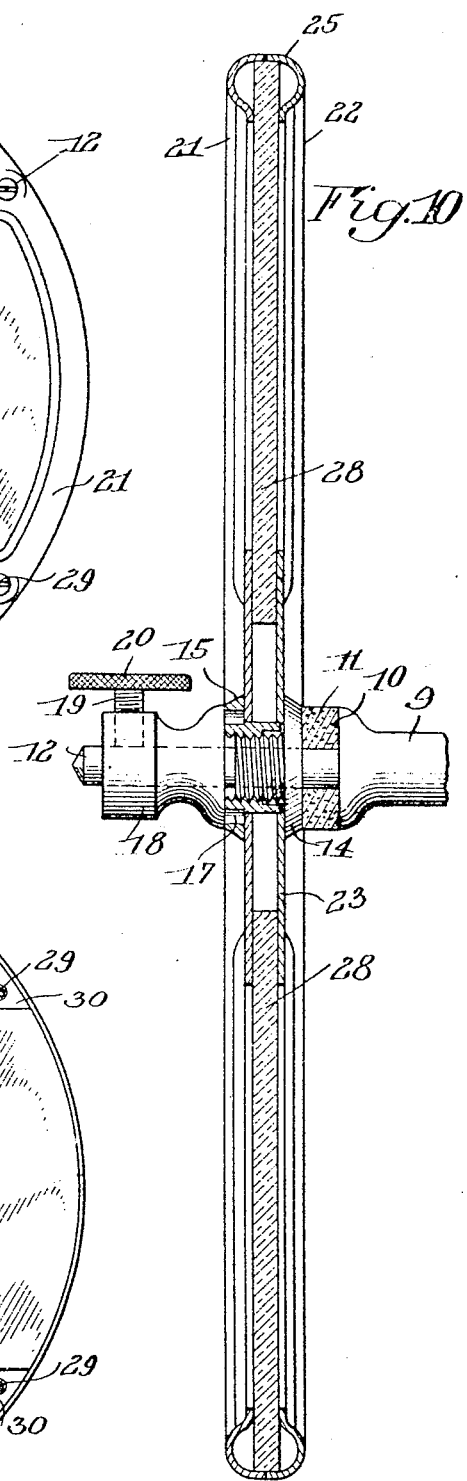

Patented Nov. 3, 1931

1,830,082

UNITED STATES PATENT OFFICE

WALTER R. BECKLEY, ALFRED E. CHURCH, AND JOSEPH F. MERKEL, OF ROCHESTER, NEW YORK, ASSIGNORS TO BECKLEY AND CHURCH INCORPORATED, OF ROCHESTER, NEW YORK, A CORPORATION OF NEW YORK

ATTACHMENT FOR CINEMA PROJECTORS

Application filed July 27, 1927. Serial No. 208,872.

Our present invention relates to optics and more particularly to cinema projecting apparatus, and it has for its object to provide a simple, efficient and inexpensive attachment for projecting cameras that will permit of filtering or coloring the projected rays from the lens so that the picture or image upon the screen will be more pleasing and realistic in appearance and be less tiring to the eyes of the observer. A further object of the invention is to provide an attachment of this kind, particularly suited to what is known as "amateur" projectors, and to types of such projectors that are already in use and upon the market.

To these and other ends the invention resides in certain improvements and combinations of parts, all as will be hereinafter more fully described, the novel features being pointed out in the claims at the end of the specification.

In the accompanying drawings:

Figure 1 is a side view of one type of projector showing an attachment constructed in accordance with and illustrating one embodiment of our invention applied thereto;

Figure 2 is an enlarged fragmentary detail section showing the manner in which our attachment is mounted upon the body of this apparatus;

Figure 3 is a side view of a differently constructed apparatus with the attachment of our invention secured thereto in a modified manner;

Figure 4 is an enlarged fragmentary top plan view of the forward portion of the apparatus shown in Figure 3;

Figure 5 is a side view of a third type of apparatus with an attachment embodying our invention applied thereto in still another manner;

Figure 6 is an enlarged fragmentary top view, partly in section, of the forward portion of the last mentioned apparatus showing the manner in which our attachment is mounted thereon;

Figure 7 is a perspective view of the bracket used in connection with the apparatus shown in Figures 5 and 6;

Figure 8 is a front view of the filtering disk used in connection with all three types of apparatus above referred to;

Figure 9 is a central section through the disk referred to, taken in the general plane thereof;

Figure 10 is an enlarged transverse section through the disk and a fragment of its mounting taken in the plane of the axis thereof;

Figure 11 is an enlarged detail section through a fragment of the margin of the disk taken on a radial line or plane;

Figure 12 is a view similar to Figure 11 but taken in a radial plane intersecting one of the fastening devices at the margin of the disk;

Figure 13 is an enlarged section showing a fragmentary view on the line 13—13 of Figure 8, and Figure 14 is an enlarged fragmentary section taken through the hub of the disk in the plane of its axis.

Similar reference numerals throughout the several views indicate the same parts.

The idea involved in our invention, in its broadest aspect, is to place upon the front of a cinema projector a rotatable disk arranged in front of the lens and adapted to present various differently colored transparent segments thereof in the axis of the lens, selectively, so that the projected rays will be colored or filtered in a manner such as will protect the eye of the observer from the glare of the image as projected upon the screen and also, when desired to impart a colorful effect simulating, for instance moonlight, twilight, etc.

To these ends we have illustrated the present embodiment of the invention in connection with several types of apparatus as aforesaid, and which we will now explain in detail.

Referring first to Figures 1, 2, 8, 9, 10 and 11 to 14 inclusive, there is illustrated in Figure 1 a projector of a familiar type embodying a base 1, an illuminator 2, a body 3 and feed and winding reels 4 and 5. the latter adapted to run the film strip through the body in the well known manner in front of the light source. It is thought sufficient to indicate all of the foregoing elements only in a general way. The lens tube of the projector is also generally indicated at 6. Upon the front of the body 3 that carries the lens tube is secured by screws 7, a mounting plate 8. In the practice of our invention and in order to make our attachment applicable to this existing construction of projector, we remove one of the screws 7 of the mounting plate and insert in place thereof a shouldered post or stud 9 in the manner clearly shown in Figure 2. This post or stud has a shoulder 10 arranged in advance of the lens and lens tube 6 along the line of its axis. Adjacent to this shoulder 10 we prefer to arrange a cork bearing washer 11 on the forwardly projecting reduced portion 12 of the post. This cork washer constitutes a thrust bearing for the disk hereinafter described.

This disk is composed (Figure 14) of a main hub 14 upon which is threaded a cooperating nut 15, the hub and nut being respectively provided with spanner openings 16 and 17, whereby they may be tightened one upon another. The complete hub, so constructed, rotates freely upon the reduced portion 12 of the post against the cork washer 11 as aforesaid. It is held against the washer with the desired pressure to produce a firm but free bearing by means of a suitable sleeve 18 (also best shown in Figure 14) that is held in place, after adjustment, by a set screw 19 provided with a knurled head 20 adapting it for operation by the fingers of the operator.

The purpose of the two part threaded hub 14—15 is to clamp securely between the elements thereof the sections 21 and 22 of a filter holding disk. These sections are preferably stamped from sheet metal and each comprises a central portion 23, radial spokes 24 and a rim 25. The radial spokes 24 are of the ribbed construction shown in Figure 13, and the rim portions 25 are also embossed as best shown in Figure 11 so that both are adapted together to embrace and secure, respectively, both the abutting side edges 26 (Figure 13) and the circumferential edges 27 (Figure 11) of a plurality of transparent segments 28 held within the disk, which segments are differently appropriately colored and may consist of glass, celluloid or other material that will both transmit and color or filter the rays of projected light from the lens tube 6.

At the junction of each spoke 24 with its rim portion 25 is a bolt 29 securing the two disk sections together. This bolt is best shown in Figure 12 as consisting of two telescoping threaded screws. They are located at the marginal edge of the intersections of the transparent segments 28 which latter are cut away at 30 as shown in Figure 9, to accommodate them.

It will be seen from the foregoing that a light, strong and durable means is provided for supporting the plurality of differently colored window sections or filters in the shape of an assembled disk in a manner in which they may be selectively rotated into position in front of the lens of the projector.

We have already described the manner in which our improved attachment is applied to a projecting apparatus of the type shown in Figures 1 and 2. Referring now to the type of apparatus shown in Figures 3 and 4, a bracket 31 may be applied to the side of the camera body 3a carrying the reels 4a and 5b, and provided with the lens tube 6a. In this instance the post or stud 9 is threaded in to the forwardly projecting socket 32 of a bracket arm 33 having jaws 34 embracing the bracket 31. A set screw indicated generally at 35 threaded into one of these jaws clamps the bracket arm 33 in position, so that the disk 25 is carried out to rotate just in front of the lens in the lens tube 6a.

With the form of apparatus shown in Figures 5, 6 and 7 there is present no mounting plate of the nature shown in Figures 1 and 2, and the bracket 31 of the device shown in Figure 3 is not entirely applicable. We therefore, in this instance, secure to the front face of the camera body 3b carrying the reels 4b and 5b and L-shaped bracket 36 having a mounting screw 37. The base of the threaded post 9 is secured to this bracket by passing through the same and being held by a nut 38, so that again the filtering disk indicated generally at 25 is disposed in an appropriate position in front of the lens tube 6b, so that it will intercept the rays from the lens and at the same time clear the reels 4b and 5b.

We claim as our invention:

1. A ray filtering disk for projecting apparatus, embodying a post having a reduced bearing thereon, a hub and a cooperating threaded nut arranged to turn on the bearing, a ray filtering medium clamped between the hub and nut elements and an adjustable sleeve for holding the hub in position on the bearing with varying degrees of frictional resistance to rotation.

2. A ray filtering disk for projecting apparatus, embodying two opposite sections comprising circumferential rim portions and comparatively narrow radial spoke portions fastened together, and a plurality of filtering mediums of segmental shape held between the sections.

3. A ray filtering disk for projecting apparatus, embodying two opposite sections comprising circumferential rim portions and comparatively narrow radial spoke portions fastened together, and a plurality of filtering mediums of segmental shape held between the sections, the abutting edges of the filtering medium being covered by the spoke portions of the sections.

4. The combination with a projecting apparatus comprising a body, feed and take-up reels, and a lens at the front of the body, of a ray filter mounted on the body for rotation about an axis substantially in the horizontal plane of said lens and at one side thereof so that the ray filter intersects the axis of the lens, said filter comprising closely adjacent filtering areas of different colors separated from each other by a comparatively narrow strip, so that light from said projecting apparatus may be filtered partly through one filtering area and partly through another filtering area of a different color, said filter remaining stationary on said axis during the projection of pictures.

5. A ray filtering device for projecting apparatus comprising, in combination, a post having an abutment thereon, a ray filtering disk rotatably mounted on said post, a sleeve longitudinally movable on said post forming a second abutment on the opposite side of said disk from the first abutment, resilient means interposed between said disk and one of said abutments, and means for securing said sleeve in any one of a plurality of positions on said post to clamp said disk and resilient means between said abutments with any desired pressure in order to produce any desired frictional resistance to rotation of said filtering disk.

6. A ray filtering device for projecting apparatus comprising, in combination, a post having an abutment thereon, a ray filtering disk rotatably mounted on said post, a sleeve longitudinally movable on said post forming a second abutment on the opposite side of said disk from the first abutment, a cork washer interposed between said disk and one of said abutments, and means for securing said sleeve in any one of a plurality of positions on said post to clamp said disk and cork washer between said abutments with any desired pressure in order to produce any desired frictional resistance to rotation of said filtering disk.

7. A ray filtering disk for projecting apparatus comprising, in combination, two frame sections each comprising a circumferential rim and a plurality of substantially radial spoke portions, a plurality of filtering mediums each of generally segmental shape, said segmental filtering mediums being assembled with their radial edges in contact with each other to prevent centripetal movement of the mediums, said frame sections lying on opposite sides of said assembled mediums with the spoke portions covering the abutting edges of said filtering mediums and with the circumferential rims embracing the circumferential edges of said filtering mediums to prevent centrifugal movement thereof, and means for holding the two frame sections in predetermined relationship to each other.

8. A ray filtering disk for projecting apparatus comprising, in combination, two frame sections each comprising a circumferential rim and a plurality of substantially radial spoke portions, a plurality of filtering mediums each of generally segmental shape with the outer corners of each segment cut off, said segmental filtering mediums being assembled with their radial edges in contact with each other to prevent centripetal movement of the mediums, said frame sections lying on opposite sides of said assembled mediums with the spoke portions covering the abutting edges of said filtering mediums and with the circumferential rims embracing the circumferential edges of said filtering mediums to prevent centrifugal movement thereof, and means passing through the spaces formed by said cut off corners for connecting the two frame sections to each other to hold them in predetermined relationship.

WALTER R. BECKLEY.
ALFRED E. CHURCH.
JOSEPH F. MERKEL.